United States Patent [19]

Casey et al.

[11] Patent Number: 4,769,716
[45] Date of Patent: Sep. 6, 1988

[54] FACSIMILE TRANSMISSION USING ENHANCED SYMBOL PROTOTYPES WITH PRECALCULATED FRONT AND BACK WHITE SPACES

[75] Inventors: Richard G. Casey, Morgan Hill; James C. King, San Jose, both of Calif.

[73] Assignee: International Business Machines Corporation, Armonk, N.Y.

[21] Appl. No.: 920,489

[22] Filed: Oct. 17, 1986

[51] Int. Cl.⁴ ............................................. H04N 1/411
[52] U.S. Cl. ...................................... 358/263; 358/260
[58] Field of Search ................................. 358/260, 263

[56] References Cited

U.S. PATENT DOCUMENTS

| 4,463,386 | 7/1984 | Goddard et al. | 358/263 |
| 4,494,150 | 1/1985 | Brickman et al. | 358/260 |
| 4,499,499 | 2/1985 | Brickman et al. | 358/263 |
| 4,499,596 | 2/1985 | Casey et al. | 382/37 |

FOREIGN PATENT DOCUMENTS

| 54-116121 | 9/1979 | Japan | 358/260 |
| 2160062 | 12/1985 | United Kingdom | 358/260 |

OTHER PUBLICATIONS

Chen, Wen-Hsiung, et al., "Combined Symbol matching-A New Approach to Facsimile Data Compression", Spie, vol. 149, Applications of Digital Image Processing (1978), pp. 2-9.

Pratt, William K., et al., "Combined Symbol Matching Facsimile Data Compression System", Proceedings of the IEEE, vol. 68, No. 7, Jul. 1980, pp. 786-796.

IBM Corporation, IBM Pageprinter 3812 Guide to Operations, No. 1686348, IBM Corporation, Oct. 1985.

IBM Corporation, IBM Pageprinter 3812 Programming Reference, No. 1686335, IBM Corporation, Oct. 1985.

Primary Examiner—James J. Groody
Assistant Examiner—Randall S. Svihla
Attorney, Agent, or Firm—Simon K. Lee; Henry E. Otto, Jr.

[57] ABSTRACT

An improved method is described for transmitting facsimiles of scanned symbols. Prototype facsimiles of each symbol in a library are enhanced by averaging the representations of each scanned symbol with a respective previously created prototype facsimile for that symbol. The amount of white space at opposite sides of each symbol prototype is determined. The enhanced prototype facsimile for each scanned symbol is associated with positional parameters denoting the average white space at said opposite sides of each symbol.

6 Claims, 4 Drawing Sheets

```
    ∇ Z←CTR_TO_CTR P;I;X;Q;Q1
[1]  ⍝ Z[I;J]=mean ctr-to-ctr distance between classes I & J
[2]  Z←(2,2⍴⌈/P[;1])⍴0
[3]  I←1
[4]  BR:50 FLASH I←I+1
[5]  Q1←P[I-1;]
[6]  Q←P[I;]
[7]  →SKP×⍳Q1[6]=0
[8]  ⍝ space or EOL: skip to next pattern
[9]  I←I+1
[10] →END
[11] SKP:
[12] X←(Q[3]+0.5×Q[5])-(Q1[3]+0.5×Q1[5])
[13] Z[1;Q1[1];Q[1]]←Z[1;Q1[1];Q[1]]+X
[14] Z[2;Q1[1];Q[1]]←Z[2;Q1[1];Q[1]]+1
[15] END:→BR×⍳I<1+⍴P
[16] Z[1;;]←Z[1;;]÷1⌈Z[2;;]
[17] ⍝ now subtract from distance half width of each pattern in pair
[18] Z[1;;]←⌊0.5+Z[1;;]-0.5×(Z[2;;]>0)×V∘.+V←AVG_WDTH P
[19] ⍝ z now gives edge-to-edge distance
```

```
∇ Z←NS SPACEMIN S;MINF;I;LP;M;N;R;C;Q;F;B;BB;FF;SS;OK;L
[1]   ᴀᴀ choice of spacing parameters to best represent intercharacter
[2]   ᴀᴀ distances. See patent "Fax enhancement by quasi-font creation"
[3]   I←0
[4]   ᴀᴀ I is a loop index
[5]   S←(OK←NS≠0)×S
[6]   ᴀᴀ S = input matrix of distances, NS tells no. of samples for ea. dis
[7]   ⎕←'NO. OF LOOPS?'
[8]   LP←⎕
[9]   ᴀᴀ LP is the number of iterations for the algorithm
[10]  M←+/S≠0
[11]  ᴀᴀ M[I]=no. of elts for which there are samples in row i
[12]  N←+⌿S≠0
[13]  ᴀᴀ N[I]=no. of elts for which there are samples in col i
[14]  R←+/S
[15]  ᴀᴀ R = row sums of S
[16]  C←+⌿S
[17]  ᴀᴀ C = col sums of S
[18]  ᴀᴀ note: R,C,M,N are as described in patent applic
[19]  L←(⍴S)[1]
[20]  ᴀᴀ L = no. of rows (or columns) in S
[21]  Q←(+/+/S)÷L*2
[22]  ᴀᴀ Q is a constant needed to adjust FF and BB
[23]  FF←F-MINF+L/F÷(C÷N)
[24]  ᴀᴀ FF is the forward blank space
[25]  BB←(B+R÷M)-(Q-MINF)
[26]  ᴀᴀ BB is the backward blank space
[27]  SS←S+(~OK)×(BB∘.+FF)
[28]  ᴀᴀ SS is a revised matrix of distances including estimates for
[29]  ᴀᴀ members missing from S
[30]  BR:I←I+1
[31]  Z←SOLVE SS
[32]  BB←Z[;1]
[33]  FF←Z[;2]
[34]  SS←S+(~OK)×(BB∘.+FF)
[35]  →BR×⍳(I<LP)
```

FIG. 5

```
∇ Z←SOLVE SS;MINF;R;C;Q;F;B;BB;FF;L
[1]   L←(⍴SS)[1]
[2]   Q←(+/+/SS)÷L*2
[3]   R←+/SS
[4]   C←+⌿SS
[5]   F←C÷L
[6]   FF←F-MINF+L/F
[7]   BB←(B+R÷L)-(Q-MINF)
[8]   Z←BB,[1.5] FF
      ∇ 12:10:43 06/30/86
```

FIG. 6

```
          COLUMN
                    1         2  --- y ---
     ROW
                                                           n
      1            s₁₁       s₁₂ --- s₁ᵧ ---         R₁ =  Σ   s₁ₖ
                                                          k=1
                                                           n
      2            s₂₁       s₂₂ --- s₂ᵧ ---         R₂ =  Σ   s₂ₖ
                                                          k=1 x            sₓ₁       sₓ₂ --- sₓᵧ ---              n
                                                     Rₓ = Σ   sₓₖ
                                                          k=1
                    n         n       n
              C₁ =  Σ  sₖ₁  C₂ = Σ sₖ₂  Cᵧ = Σ sₖᵧ
                   k=1       k=1      k=1
```

$$R_1 = \sum_{k=1}^{n} s_{1k}$$

$$R_2 = \sum_{k=1}^{n} s_{2k}$$

$$R_x = \sum_{k=1}^{n} s_{xk}$$

$$C_1 = \sum_{k=1}^{n} s_{k1} \quad C_2 = \sum_{k=1}^{n} s_{k2} \quad C_y = \sum_{k=1}^{n} s_{ky}$$

FIG. 7

FACSIMILE TRANSMISSION USING ENHANCED SYMBOL PROTOTYPES WITH PRECALCULATED FRONT AND BACK WHITE SPACES

TECHNICAL FIELD

This invention relates to facsimile transmission and compression. More particularly, it relates to a method for improving the appearance of a transmitted facsimile and for reducing the amount of data transmitted for the creation of the facsimile.

DESCRIPTION OF THE PRIOR ART

Brickman et al, in U.S. Pat. No. 4,499,499, describe a pattern matching system where documents are transmitted as OCR (Optical Character Recognition) scanned symbols. The transmitting system and the receiving system therein both maintain identical libraries of prototypes. Each prototype is given an identification code and is transmitted only once, upon its initial recognition. Transmission reduction is achieved because subsequent repetitive symbols are transmitted by sending their identification codes only.

Pratt et al, in "Combined System Matching Facsimile Data Compression System," Proceedings of the IEEE, Vol. 68, No. 7, July 1980, also take advantage of symbol repetitions in document to achieve facsimile compression and transmission reduction. The system compares each input symbol with entries of a prototype library. If a match is indicated, a corresponding library ID and the horizontal location with respect to the previous symbol are coded. Otherwise, the binary pattern of the symbol is transmitted, in addition to being placed in the library as a new prototype element.

Casey et al, in U.S. Pat. No. 4,499,596, compare input PEL patterns with library prototypes. Upon match, an index number is generated. Upon mismatch, the pattern will be registered as a new prototype in the library.

In these prior pattern matching facsimile systems, each prototype is sent immediately upon first recognition. Noise due to poorly printed documents could result in poorly chosen prototypes and thereby cause poor image quality in the received document. Moreover, because inter-character spaces are not determined in these prior systems, each identification code must therefore be accompanied by an address that indicates the symbol's relative position in the document. A significant reduction in data transmission will result in the need to transmit this one address for each and every symbol is eliminated.

SUMMARY OF THE INVENTION

The present invention relates to a method for facilitating the transmission as well as improving the appearance of a facsimile.

Transmission reduction is accomplished by determining the amount of white space at opposite sides of each prototype. The amount of white space is sent to the receiving system together with the prototype as one of its parameters. When repetitive symbols of the prototype are subsequently encountered, only the identification code is sent. The prototype is retrieved as a pseudo font character having the white space imbedded therein. As inter-character spaces have already been determined for the pseudo fonts, only the address of a first symbol in a page of the document needs to be sent. Subsequent symbols may be positioned next to each other without the need for more addresses.

Appearance of the transmitted facsimile is improved by taking advantage of the redundancy which exists in the repetitions of symbols in the document to be transmitted. The transmitting system takes the average of all input symbols which match the same pattern and transmits the average as the prototype for those symbols. As a result, the quality of a transmitted facsimile is enhanced.

BRIEF DESCRIPTION OF THE DRAWINGS

FIG. 3a shows ten characters from a scanned document that belong to the same prototype;

FIG. 3b shows an average of the ten characters in FIG. 3a;

FIG. 4 is a segment of the APL source code for determining the mean center-to-center distances between class i and class j symbols;

FIG. 5 is a segment of the APL source code for determining the white spaces $b_i$ and $f_i$ of class i symbols;

FIG. 6 is the APL routine called by the procedure in FIG. 5 for iteratively determining $b_i$ and $f_i$; and FIG. 7 is a matrix of average edge-to-edge distances between different classes of symbols.

THEORETICAL DESCRIPTION

Figure 1:
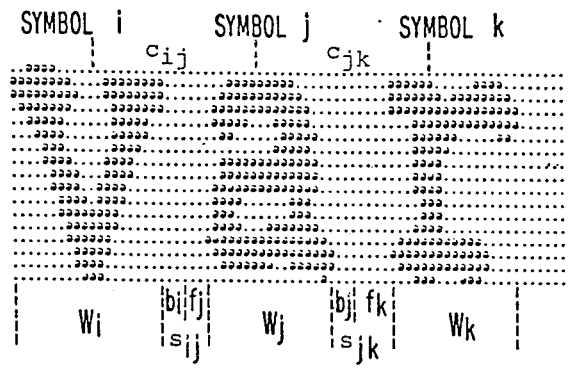
FIG. 1 illustrates a portion of a line of a document to be transmitted.

FIG. 1 illustrates a text line of a document which is optically scanned for digital facsimile transmission. A matrix representation of the line is obtained and the locations of individual character patterns are determined. Symbol i (the character "v") is followed by symbol j (the character "a") which in turn is followed by symbol k (the character "r"). The space parameters of a symbol are characterized by its width W, its front white space f and its back white space b. Symbols i and j are separated by a white space $s_{ij}$ which is equal to $b_i + f_j$ dot columns. Symbols j and k are separated by $s_{jk}$ which has $b_j + f_k$ dot columns.

$W_j$, $S_{ij}$ and $s_{jk}$ of symbol j can be directly measured on the digital image. The front white space $f_j$ and the back white space $b_j$ of the symbol are, however, not directly measurable and can only be derived from a matrix of values of $s_{ij}$ and $s_{jk}$.

In pattern matching terminology, "class i" is defined as the ensemble of symbol patterns that match the ith prototype.

Parameter $W_i$ can be estimated as the mean value of the widths observed for members of class i.

In order to estimate $b_j$ and $f_j$, the inter-character spaces are first measured for the entire document. Let $s_{ij}$ be the average white space between patterns of class i and class j. Estimates of $b_j$ and $f_j$ can be obtained by minimizing the squared sum of differences SD of equation $$SD = \sum_{i}^{n} \sum_{j}^{n} \delta_{ij} [s_{ij} - (b_i + f_j)]^2 \tag{1}$$

where

-continued $$\delta_{ij} = \begin{cases} 1 \text{ if the class sequence } (i,j) \text{ occurs in the text} \\ 0 \text{ otherwise} \end{cases}$$

The minimization is performed by differentiating equation (1) with respect to $b_j$ and $f_j$ and equating the result to zero. This yields 2 n equations:

$$R_j = m_j b_j + \sum_{k}^{n} \delta_{jk} f_k, j = 1 \text{ to } n \quad (2)$$

$$C_j = n_j f_j + \sum_{i}^{n} \delta_{ij} b_i, j = 1 \text{ to } n \quad (3)$$

where $$R_j = \sum_{k}^{n} \delta_{jk} s_{jk}$$

sum of estimated front spaces of all prototypes that immediately follow $j$ $$C_j = \sum_{i}^{n} \delta_{ij} s_{ij}$$

sum of estimated back spaces of all prototypes that immediately precede prototype $k$ $$m_j = \sum_{k}^{n} \delta_{jk}$$

number of prototypes that immediately follow prototype $j$ $$n_j = \sum_{i}^{n} \delta_{ij}$$

number of prototypes that immediately precede prototype $k$ (A)

If every class pair is present, i.e., if $\delta_{ij}=1$ for all i,j then the equations to be solved are:

$$R_j = nb_j + \sum_{j}^{n} f_i, j = 1 \text{ to } n$$

$$C_j = nf_j + \sum_{i}^{n} b_i, j = 1 \text{ to } n$$

with solutions $$b_j = \frac{R_j}{n} - \sigma_b j = 1 \text{ to } n \quad (4)$$

$$f_j = \frac{C_j}{n} - \sigma_f j = 1 \text{ to } n \quad (5)$$

where $\sigma_b$, $\sigma_f$ are arbitrary constants satisfying $$\sigma_b + \sigma_f = \frac{1}{n^2} \sum_{i}^{n} \sum_{j}^{n} s_{ij} \quad (6)$$

These constants should be chosen such that all the spacing parameters are non-negative.

(B)

If not all class pairs occur in the document, the general case can be solved by first obtaining initial estimates of $b_j$, $f_j$ using $$b_j^{(0)} = \frac{R_j}{m_j}, j = 1, 2, \ldots n$$

$$f_j^{(0)} = \frac{C_j}{n_j}, j = 1, 2, \ldots n$$

These values are then used to estimate the missing $s_{ij}$, i.e., $$s_{ij}^{(1)} = \begin{cases} b_i^{(0)} + f_j^{(0)} \\ s_{ij} \quad \text{otherwise.} \end{cases}$$

This provides a complete set of $s_{ij}$. Equations 4, 5 and 6 can be used to obtain new estimates of $b_j$, $f_j$. Iterating on this procedure, at the kth loop, $$b_j^{(k)} = \frac{R_j^{(k-1)}}{n} - \sigma_b^{(k-1)}$$

$$f_j^{(k)} = \frac{C_j^{(k-1)}}{n} - \sigma_b^{(k-1)}$$

can be computed. The process is iterated until convergence.

Variations in character width affect the observed values of $s_{ij}$; e.g., a faded character will contribute extra white space. A more accurate estimate can be obtained by measuring the average center-to-center distances $c_{ij}$ between characters of classes i and j rather than the blank space $s_{ij}$. The procedure above may then be used to minimize the equation $$SD' = \sum_{i}^{n} \sum_{j}^{n} \delta_{ij} \left[ c_{ij} - \left( b_i + f_j + \frac{w_i}{2} + \frac{w_j}{2} \right) \right]^2$$

The minimization proceeds exactly as before, except that $s_{ij}$ is replaced by $$\left( c_{ij} - \frac{w_i + w_j}{2} \right)$$

in $R_j$ and $C_j$ as defined for Equations 2 and 3.

DESCRIPTION OF THE PREFERRED EMBODIMENT

Figure 2:
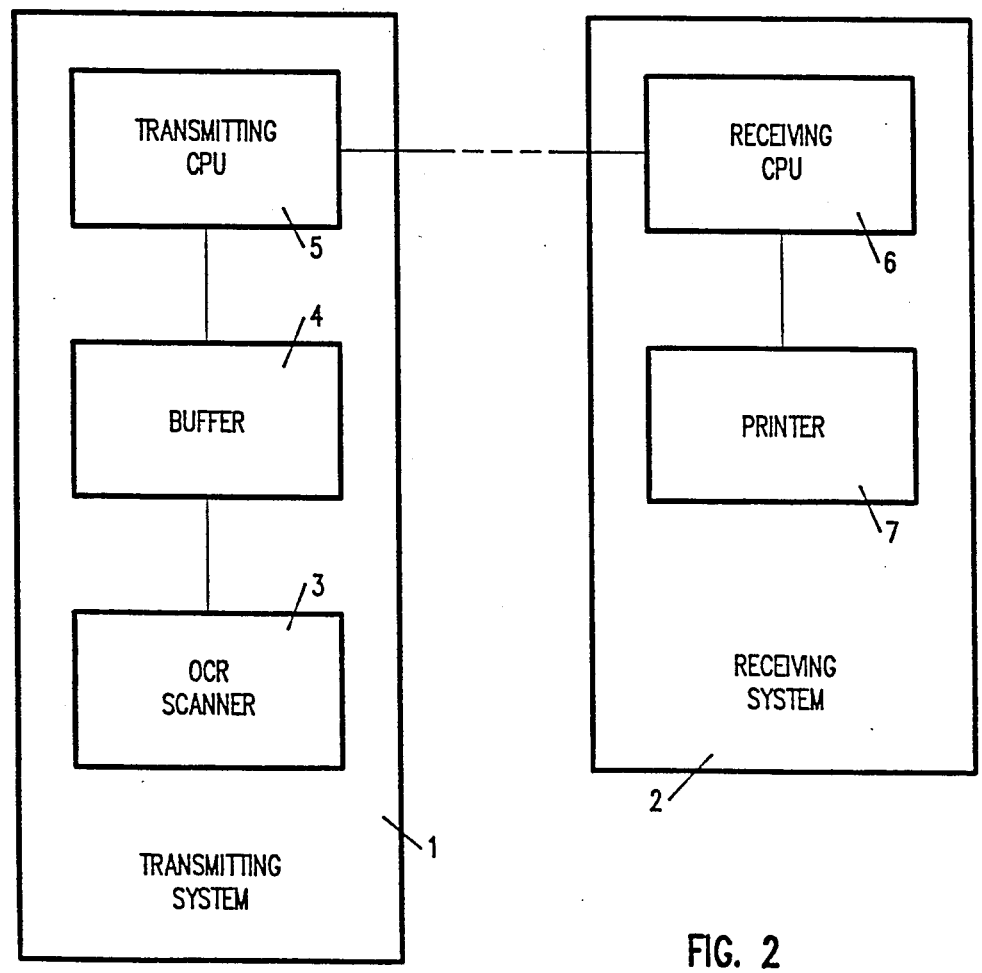
FIG. 2 illustrates a logical block diagram of the system configuration embodying the present invention.

FIG. 2 illustrates a configuration having a transmitting system 1 and a receiving system 2. The transmitting system 1 consists of a commercially available scanner 3 such as the IBM model 8815. Scanner 3 scans the document to be transmitted and produces data output which is saved in buffer 4. Buffer 4, which is an IBM PC in this implementation, also functions as a terminal to the Central Processing Unit (CPU) 5. CPU 5 can be an IBM System/370 CPU running under an APL interpreter defined by the APL Language Processor, Release No. 3 published in the IBM Manual No. GC 26-3847, 5th Edition, in 1978. System/370 architecture is described in Amdahl et al, U.S. Pat. No. 3,226,689, and in the publication "IBM Systems/370 Principles of Operation," form A22-7000-4. Although a reduction to practice has used APL source code running under an IBM System/370 computer, other programming languages and computing apparatus can also be implemented to perform equivalent functions without undue experimentation.

The receiving system 2 consists of a receiving CPU 6 which can also be an IBM System/370 computer. Receiving CPU 6 is connected to a printer flexible page printer (often called laser printer) 7 such as the IBM page printer model 3812 which allows fonts to be downloaded from its host computer.

Since methods for symbol pattern matching have been cited as prior art above, the method of this invention will be understood more clearly be starting the description at the point where symbols have already been scanned and matched against a library of prototypes.

(a) Noise Reduction by Averaging

The document to be transmitted is scanned by the OCR scanner 3. Each scanned symbol received by the transmitting CPU 5 is registered as a p×q bit array in which a "1" bit represents a black PEL while a "0" denotes a white PEL. The transmitting CPU matches each bit array to a pattern and assigns thereto an identification code (ID) depending on the matched pattern. The bit array and the ID of the symbol are then stored in the memory.

When the end of the document is reached, the transmitting CPU retrieves the stored bit arrays and their respective ID's. It then averages the bit arrays in a manner similar to that described by the pseudo code of Table 1.

```
Do for id=1 to M       M=total of number of prototypes
   Initialize n to O
   Initialize array A(p,q) to O
   Do for k=1 to Z      Z=total number of stored arrays
      Read array (k)
      If ID of array (k)=id
         Increment n
         Do for i=1 to p, j=1 to q
            Add bit(i,j) of array (k) to A(i,j)
         Enddo
      Endif
   Enddo
   Divide A(i,j) by n
   Do for i=1 to p, and j=1 to q
      If A(i,j) is greater than a threshold
         then A(i,j)=1, else A(i,j)=0
      Endif
   Enddo
```

Figures 3A, 3B, 4:
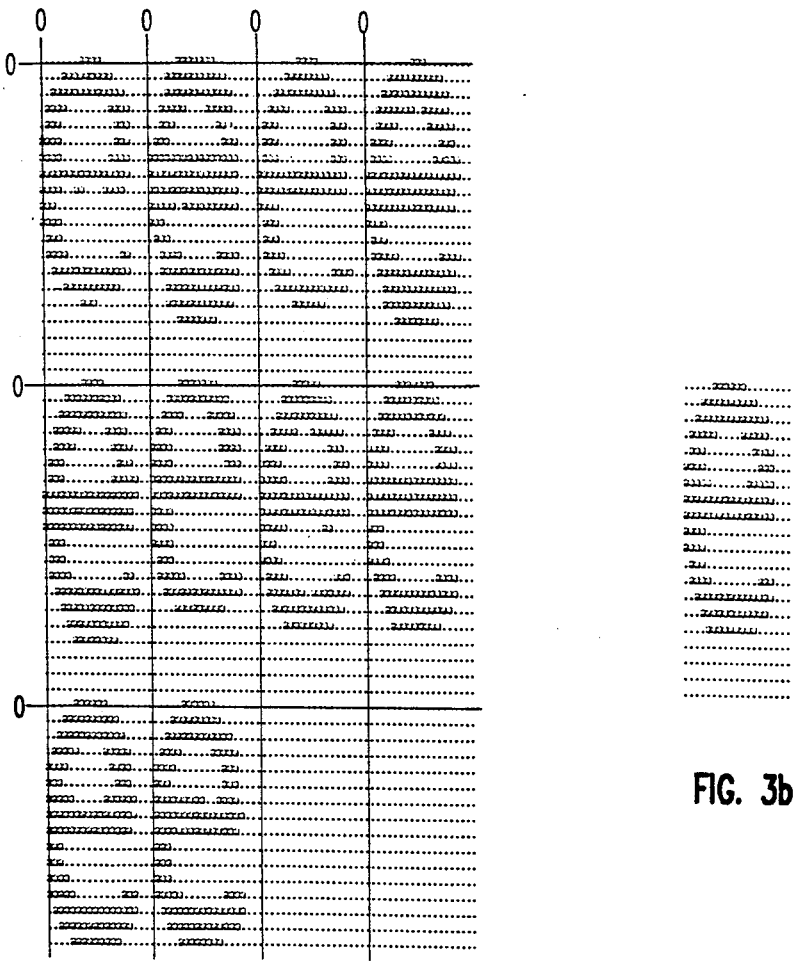

FIG. 3a shows ten symbols which match the same prototype pattern. FIG. 3b shows the average of these ten symbols. The average of FIG. 3b is derived by summing the ten arrays and thresholding at a value=5.

The result of the averaging, A(i,j), of all bit arrays belonging to a pattern is then used as an enhanced prototype for that pattern. It is sent to the receiving system where it is used to build a font. During the recreation of the document, the font is used when a corresponding symbol is to be printed.

(b) Determining White Space Parameters

The center-to-center distances $c_{ij}$ between symbols of class i and class j are measured. The average of $c_{ij}$ is then calculated in a procedure similar to the procedure listed in Table 1. The width $w_i$ of the enhanced prototype i and the width $w_j$ of the enhanced prototype j are determined after the averaging step of section (a) above has been performed. Subtracting half of $w_i$ and half of $w_j$ from the average of $c_{ij}$ gives the average edge-to-edge distance $s_{ij}$ between symbols of classes i and j.

FIG. 4 shows a listing of the APL source code for determining the average edge-to-edge distances $s_{ij}$ between symbols of classes i and j. Although edge-to-edge distances are used in this implementation, the method of this invention for calculating white spaces can be practiced without undue experimentation using other distances between prespecified points of symbols.

After all existing edge-to-edge distances $s_{ij}$ have been determined, they are put into a matrix of the form illustrated in FIG. 7.

Each row x of the matrix in FIG. 7 contains the average distances $s_{xk}$, $1 \leq k \leq N$, of all sequences (x,k) having symbols of x as immediately preceding symbols. Each column y of the matrix contains the average distances $s_{ky}$, $1 \leq k \leq N$, of all sequences (k,y) having symbols of y as immediately succeeding symbols.

Not every symbol pair is present in the document. Thus, there are some missing entries in the matrix. Equations (4) and (5), however, can only be used when all symbol pairs are present; therefore the missing $s_{ij}$ entries must be determined.

FIG. 5 shows a listing of a segment of the APL source code for finding estimates of the missing $s_{ij}$. In line 14, the sum of all existing entries of each row is calculated (as R in the APL source code). $R_j$ is the average white space between two symbols having class j as a succeeding symbol. Similarly, the sum of all existing entries of each column is calculated (as C in the APL source code). $C_j$ is the average white space between two symbols having class j as the preceding symbols. The constant $$\sigma_b + \sigma_f = \frac{1}{n^2} \sum_i^n \sum_j^n s_{ij}$$

is calculated in lines 19-21 of FIG. 5 (represented in the code as Q).

In line 23, a row matrix F is obtained. Each ith element of F is the average value of the distances $s_{ki}$, $1 \leq k \leq n$, of sequences (k,i) having symbols of class i as immediately succeeding symbols. MINF of line 23 contains the smallest element of matrix F. FF is a row matrix formed by subtracting each element of F by MINF. Each jth element of the matrix FF is an estimated value of a corresponding $f_j$.

In line 25, a column matrix B is obtained. Each jth element of B is the average value of the distances $s_{ik}$, $1 \leq k \leq n$, of sequence (j,k) having symbols of class i as immediately preceding symbols. BB is a column matrix obtained by subtracting each element of B by the value (Q-MINF). Each jth element of the matrix BB is an estimated value of a corresponding $b_j$.

In line 27, a nxn matrix is formed by combining BB and FF using the outer product function of APL. A corresponding term in this new matrix is applied to each missing entry of the original matrix, thereby forming a new complete matrix SS of average distance of all $s_{ij}$'s.

FIG. 6 shows a listing of APL source code used in conjunction with lines 30 to 35 of the APL code of FIG. 5. The code in FIG. 6 iteratively revises the matrix SS, BB and FF, thereby obtaining better values of $b_j$ and $f_j$.

While the invention has been particularly shown and described with respect to the preferred embodiment thereof, it will be understood by those skilled in the art that various changes in form and detail may be made without departing from the spirit and scope of the invention.

We claim:

1. An improved method for transmission of facsimiles of symbols scanned from a record including the steps of creating a library of prototype facsimiles of symbols, matching a representation of each symbol as it is scanned to a corresponding one of the prototype facsimiles in the library, and generating data identifying the position of each scanned symbol on the record, wherein the improvement comprises the steps of:

enhancing each of the prototype facsimiles in the library by averaging all of the representations of the scanned symbols which were matched to that prototype facsimile, thereby creating a library of enhanced prototype facsimiles;

determining the amount of white space at opposite sides of each scanned symbol; and associating with the enhanced prototype facsimile for each scanned symbol positional parameters denoting the average white space at the opposite sides of that symbol.

2. In a facsimile transmission system of the type wherein a facsimile of a document is transmitted from a transmitting processor by scanning symbols from the document and sending to a receiving processor unique identification codes each corresponding to a respective prototype of a different symbol scanned from the document, an improved method for reducing the amount of data required to be transmitted including the steps of:

determining the amount of white space which is to appear at opposite sides of each prototype; and designating for each prototype parameters comprising corresponding codes representing the amount of white space which is to appear at the opposite sides of that prototype.

3. The method of claim 2, further including the steps of:

as each symbol is scanned from the document, representing such symbol as a p×q bit array in which one binary state represents a black pel and the opposite state represents a white pel;

matching each bit array to one prototype in a library of prototypes; and averaging all of the bit arrays which were matched to each particular prototype in said library of prototypes to create an enhanced library of prototypes.

4. The method of claim 3, further including the step of transmitting to the receiving processor the library of enhanced prototypes to be used in recreating the document.

5. The method of claim 2, wherein the determining step includes:

measuring the center-to-center distance between the symbols of each pair of adjacent symbols scanned from the document;

calculating the average of all of the center-to-center distances measured for each unique pair of adjacent symbols;

measuring the width of each prototype; and deriving the average edge-to-edge distance between the symbols of each unique pair of adjacent symbols by subtracting half the widths of the prototypes corresponding to each such symbol from the corresponding average center-to-center distance.

6. The method of claim 5, further including the step of:

deriving the average edge-to-edge distance between the symbols of each unique pair of adjacent symbols not present in the scanned document.

* * * * *